United States Patent [19]
Walker

[11] 3,750,456
[45] Aug. 7, 1973

[54] MEANS FOR DETERMINING HEADING ALIGNMENT IN AN INERTIAL NAVIGATION SYSTEM

[75] Inventor: Ferman L. Walker, Cedar Rapids, Iowa

[73] Assignee: Collins Radio Company, Cedar Rapids, Iowa

[22] Filed: Dec. 30, 1970

[21] Appl. No.: 102,575

[52] U.S. Cl. ............................................. 73/1 E
[51] Int. Cl. ........................................... G01c 25/00
[58] Field of Search ..................... 73/1 E; 33/226 Z

[56] References Cited
UNITED STATES PATENTS

| | | | |
|---|---|---|---|
| 3,241,363 | 3/1966 | Alderson et al. | 33/226 Z |
| 3,107,514 | 10/1963 | Walker | 73/1 E |
| 3,226,971 | 1/1966 | Tierney | 73/1 E |

*Primary Examiner*—S. C. Swisher
*Attorney*—Robert M. Sperry and Robert J. Crawford

[57] ABSTRACT

This invention relates to apparatus for determining the heading alignment of an inertial navigation system by allowing the inertial platform to drift and employing the outputs of the accelerometers on the platform axes to compute the drift rate components, determining the amount and direction of platform drift corresponding to the computed components, and correcting the heading data of said system with the computed data.

4 Claims, 1 Drawing Figure

PATENTED AUG 7 1973 3,750,456
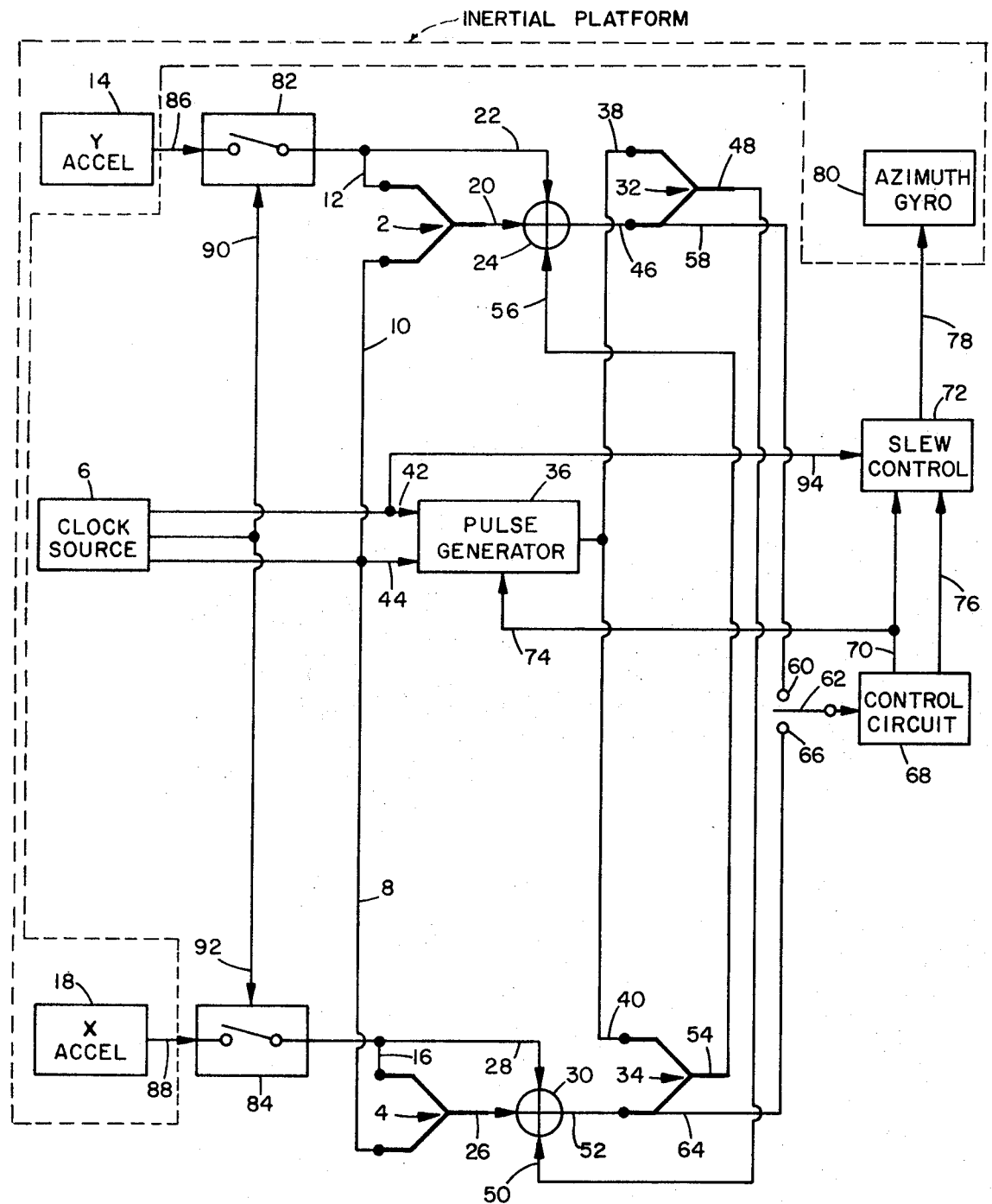
INVENTOR
FERMAN L. WALKER
BY Robert M. Sperry
ATTORNEY

MEANS FOR DETERMINING HEADING ALIGNMENT IN AN INERTIAL NAVIGATION SYSTEM

This invention relates to navigation systems and is particularly directed to means for determining heading alignment in Schuler-tuned inertial navigation systems.

In Schuler-tuned inertial navigation systems, the inertial platform must be precisely oriented with respect to heading and local level prior to take-off. Thereafter, enroute changes in the platform orientation are made in accordance with measured vehicle motions and computed earth motions to maintain the prescribed platform orientation with respect to the earth and hence to provide useful navigation information. Obviously, the accuracy and reliability of such a system are directly related to the precision of the pre-takeoff orientation. In fact, in order to provide the accuracy demanded for trans-global flights, it is necessary that the pre-takeoff heading orientation be accurate to within 0.1°. However, the means employed heretofore for providing the pre-takeoff heading orientation have frequently been subject to errors far exceeding this value. Thus, for example, magnetic compasses may be deflected several degrees by steel contained in loading ramps, terminal buildings and the like which may be located adjacent the airplane.

These disadvantages of the prior art are overcome with the present invention and means are provided for precisely orienting the platform without recourse to heading information from external sources.

The advantages of the present invention are preferably attained by preventing precessing the gyros with earth-rate components so that said platform will drift, using the outputs of the accelerometers on said platform for the data used in computing the drift rate components about said platform axes, computing said drift rate components in such a manner that the mean-squared errors in the computed values of said drift rate components are minimized, computing the amount and direction of said platform displacement that would have produced said drift rate components, establishing a signal to cause the gyros to precess in a manner to slew said platform to reduce said displacement to zero, and discontinuing said signal upon attainment of zero displacement of said platform.

Accordingly, it is an object of the present invention to provide an improved inertial navigation system.

Another object of the present invention is to provide improved means for aligning an inertial navigation system.

A further object of the present invention is to provide means for accurately aligning the inertial platform of an inertial navigation system without using heading information from sources external to said system.

A specific object of the present invention is to provide means for preventing precessing the gyros with earth-rate components so that said platform will drift, using the outputs of the accelerometers on said platform for the data used in computing the drift rate components about said platform axes, computing said drift rate components in such a manner that the mean-squared errors in the computed values of said drift rate components are minimized, computing the amount and direction of said platform displacement that would have produced said drift rate components, establishing a signal to cause the gyros to precess in a manner to slew said platform to reduce said displacement to zero, and discontinuing said signal upon attainment of zero displacement of said platform.

These and other objects and features of the present invention will be apparent from the following detailed description taken with reference to the accompanying drawing. In the drawing:

The FIGURE is a diagrammatic representation of apparatus embodying the present invention.

In that form of the present invention chosen for illustration, the FIGURE shows a pair of integrator circuits 2 and 4 each having one input thereof connected to receive timing pulses from a suitable clock source 6, as seen at 8 and 10 for the purpose of establishing in these integrators time-dependent weighting functions needed in forming the platform drift rate estimates. Integrator 2 has its other input 12 connected to receive signals from a switch 82 whose input 86 is from the Y-axis accelerometer 14 of the inertial platform. Similarly, integrator 4 has its other input 16 connected to receive signals from a switch 84 whose input 88 is from the x-axis accelerometer 18 of the inertial platform. The operation of switches 82 and 84 are controlled by inputs 90 and 92, respectively, from clock source 6. The outputs of integrator circuit 2 and switch 82 are applied, respectively, to inputs 20 and 22 of a first Delta Y adder circuit 24. Similarly, the outputs of integrator circuit 4 and switch 84 are applied, respectively, to the inputs 26 and 28 of a second Delta Y adder circuit 30. A second pair of integrator circuits 32 and 34 are provided and each have one input thereof connected to receive pulses from a pulse generator 36, as indicated at 38 and 40. Pulse generator 36 is controlled through input 42 by signals from clock source 6 and generates pulses at a rate determined by clock source 6 through input 44. Integrator circuit 32 has its second input 46 connected to the output of one Delta Y adder circuit 24, while one output 48 of integrator circuit 32 is connected to the third input 50 of the other Delta Y adder circuit 30. Similarly, integrator circuit 34 has its second input 52 connected to the output of Delta Y adder circuit 30, while one output 54 of integrator circuit 34 is connected to the third input 56 of Delta Y adder circuit 24. A second output 58 of integrator circuit 32 is connected to contact 60 of switch 62, while a second output 64 of integrator circuit 34 is connected to contact 66 of switch 62. The position of switch 62 determines whether the x- or y- axis of the platform is to be aligned and passes the appropriate signals to control circuit 68. Control circuit 68 senses the polarity of the signals received from switch 62 and has a first output 70 which is applied to slew control 72 to cause slewing of the platform azimuth axis in the desired direction; the direction being determined by the polarity of the output 70 from control circuit 68. In addition, the output 70 of control circuit 68 is fed back to pulse generator 36, as seen at 74, to control the polarity of the pulses emitted by pulse generator 36. Slew control 72, when turned on by input 94 from clock source 6, provides an output 78 to the azimuth gyro 80 to cause slewing of the platform in the direction indicated by input 70 from control circuit 68. Control circuit 68 also includes means for sensing a change in the polarity of the signals from switch 62 and has a second output 76 which, upon reversal of the polarity of the signals from switch 62, applies a signal to slew control 72 to discontinue the slewing.

In operation, the inertial platform is set approximately level, and the alignment mechanism is actuated, causing switches 82 and 84 to close. No precession signals are applied to the gyros to compensate for rotation of the earth, hence the platform will drift. Accelerometers 14 and 18 sense the acceleration caused by the platform drifts that result from rotation of the earth and generate signals indicative of the magnitude of this drift rate. As is well known, the drift rate is a function of latitude and varies from 15° per hour at the equator to 0° per hour at the poles. Accelerometer 14 determines the acceleration of the y-axis of the platform and supplies this information through switch 82 to input 12 of integrator circuit 2 and to input 22 of Delta Y adder circuit 24. Integrator circuit 2 combines this input with the timing pulses from clock source 6 and generates a signal, indicative of y-axis acceleration as a function of time, which it applies to input 20 of Delta Y adder 24. The purpose of Delta Y adder 24 is to allow the simultaneous application of a plurality of signals to input 46 of integrator circuit 32. Integrator circuit 32, after a predetermined period of time, establishes a signal indicative of the level component of the earth rotation rate multiplied by the sine of the angle existing between the x-axis of the platform and North. The signal established in integrator circuit 32 is formed in such a manner that the mean-squared error in the estimated platform heading is minimized.

At the same time, accelerometer 18 determines the acceleration of the X-axis of the platform and supplies this information through switch 84 to input 16 of integrator circuit 4 and to input 28 of Delta Y adder circuit 30. Integrator circuit 4 combines this input with the timing pulses from clock source 6 and generates a signal, indicative of X-axis acceleration as a function of time, which is applied to input 26 of Delta Y adder circuit 30. Delta Y adder circuit 30 serves to allow the simultaneous application of a plurality of signals to input 52 of integrator circuit 34. Integrator circuit 34, after a predetermined period of time, establishes a signal indicative of the level component of the earth rotation for a North heading multiplied by the cosine of the angle existing between the x-axis of the platform and North. The signal established in integrator circuit 34 is formed in such a manner that the mean-squared error in the estimated platform heading is minimized. Integrator circuit 32 applies its output signal 58, indicative of the smallest angle between North and the x-axis of the platform, to contact 60 of switch 62. Similarly, integrator circuit 34 applies its output signal 64, indicative of the smallest angle between North and the y-axis of the platform, to contact 66 of switch 62.

The operator determines, at his option, which axis of the platform is to be aligned with North and places switch 62 in the selected position. This causes the signals from the appropriate one of the integrator circuits 32 or 34 to be applied to control circuit 68. As indicated above, the signals from integrator circuits 32 and 34, at the appropriate point in time, indicate the smallest angle between North and the respective axis of the inertial platform. Moreover, the polarity of these signals indicates the directon in which the selected axis must move in order to achieve alignment with North. Control circuit 68 senses this polarity and applies signals through output 70 to pulse generator 36 and to slew control 72. Integrator 32 thus forms a signal proportional to the sine of the angle between the X-axis and north. If this signal is positive, the smallest angle through which the platform could be slewed to point the X-axis north would be realized by slewing in the negative direction. If the signal from integrator 32 is negative, the platform should be slewed in the positive direction. Thus this integrator output which indicates the sine of the angle between the X-axis and north, also indicates which direction is the smallest slew angle to point the platform north. When clock source 6 determines that the period of time required for operation of integrator circuits 2, 4, 32, and 34 has elapsed, it supplies a signal to input 90 of switch 82 and to input 92 of switch 84 to open switches 82 and 84, and at the same time supplies a signal to input 42 of pulse generator 36 and to input 94 of slew control 72. Input 94 causes slew control 72 to generate a slewing common 78 to slew the azimuth gyro 80 at a constant rate in the direction indicated by the polarity of output signal 70 from control circuit 68. Input 42 causes pulse generator 36 to emit pulses at the rate determined by input 44 from clock source 6 and with the same polarity as the signals received on input 74 from output 70 of control circuit 68. The output from pulse generator 36 is supplied to input 38 of integrator 32 and to input 40 of integrator 34, causing the angles indicated by outputs 58 and 64 to slew at the same rate and in the same direction as the platform is slewing. The signal from integrator circuit 32 is fed back, via output 48 and Delta Y adder 30, to integrator circuit 34; while the signal from integrator circuit 34 is fed back, via output 54 and Delta Y adder 24, to integrator circuit 32 to accomplish the slewing of the angle indicated by outputs 58 and 64. When the selected axis of the platform coincides with North, the integrator circuits 32 and 34 will reverse the polarity of the signals supplied through switch 62 to the control circuit 68. Control circuit 68 senses this change of polarity and applies a signal through output 76 which instructs slew control 72 to terminate the slew command 78 to the azimuth gyro 80. The termination of the slew command can also be used to indicate that the alignment operation is completed.

Obviously, if desired, the output signals from control circuit 68 could be employed to determine the heading and to insert this into the computer, instead of slewing the platform. In addition, numerous variations and modifications can be made without departing from the present invention. Accordingly, it should be clearly understood that the form of the present invention described above and shown in the accompanying drawing is illustrative only and is not intended to limit the scope of the present invention.

What is claimed is:

1. Apparatus for effecting a predetermined initial azimuth alignment of an approximately level inertial platform at a given fixed geographical position on the surface of the earth, said apparatus comprising:
   means for preventing precessing of a platform oriented azimuth stabilizing gyro means with earth-rate components to allow said platform to drift,
   means establishing electrical signals indicative of the drift-rate components about the axes of said platform having minimal mean-square errors,
   means responsive to said electrical signals for establishing a command signal indicative of the amount and direction of platform displacement from said initial azimuth alignment and corresponding to said drift-rate components, means applying said command signal to precess the azimuth gyro of said platform in a manner to slew said platform to reduce said displacement to zero, and means responsive to attainment of zero displacement by said platform for discontinuing said command signal.

2. Apparatus for aligning an inertial navigation system having an inertial platform, said apparatus comprising:

a pair of accelerometers each mounted to sense acceleration of a respective axis of said platform, a first pair of integrator circuits each having one input thereof connected to receive signals from a respective one of said accelerometers, a clock source connected to apply timing pulses to the other input of each of said first pair of integrator circuits, a pair of Delta Y adders each having three inputs and one output, a second pair of integrator circuits each having one input thereof connected to the output of a respective one of said Delta Y adders and each having one output thereof connected to a first input of the opposite one of said pair of Delta Y adders.

means connecting a second input of each of said Delta Y adders to the output of a respective one of said first pair of integrator circuits, means connecting a third input of each of said Delta Y adders to receive signals from the respective one of said accelerometers connected to said respective one of said first pair of integrator circuits, a pulse generator connected to receive timing pulses from said clock source and supplying pulses to the other input of each of said second pair of integrator circuits, switch means connected to receive the output of each of said second pair of integrator circuits and operable to pass the signals from a selected one of said second pair of integrator circuits, control circuit means connected to receive the signals passed by said switch means and operative to sense the polarity of said signals and to apply a signal to said pulse generator to control the polarity of the pulses emitted by said pulse generator, and means connected to receive signals from said clock source and from said control circuit means and responsive thereto to correct the azimuth data of said inertial navigation system.

3. The apparatus of claim 2 wherein said last named means comprises:

gyroscopic means operable to slew the azimuth heading of said platform, and slew control means connected to receive signals from said clock source and from said control circuit means and responsive thereto to cause said gyroscopic means to slew said platform in the direction indicated by said signals from said control circuit means.

4. The apparatus of claim 3 wherein:

said control circuit also includes means for sensing a change in the polarity of the signals passed by said switch means and operative in response to such change to apply a signal to said slew control means to discontinue slewing of said platform.

* * * * *